(No Model.)
T. B. JEFFERY.
VELOCIPEDE.
No. 441,417. Patented Nov. 25, 1890.
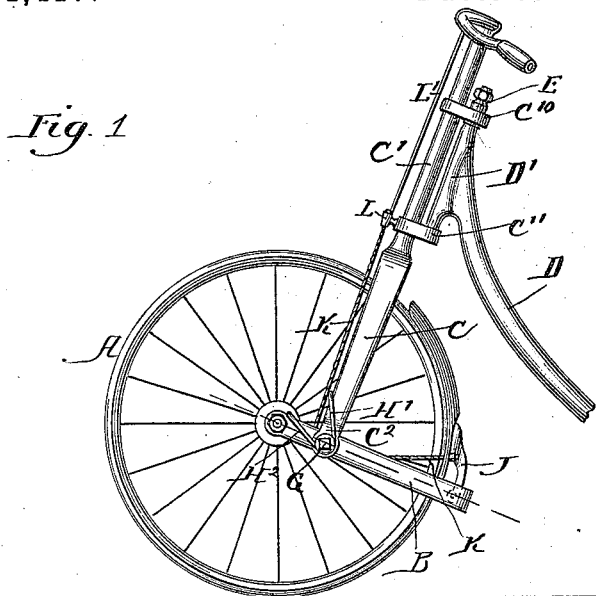

UNITED STATES PATENT OFFICE.

THOMAS B. JEFFERY, OF CHICAGO, ILLINOIS.

VELOCIPEDE.

SPECIFICATION forming part of Letters Patent No. 441,417, dated November 25, 1890.

Application filed February 5, 1890. Serial No. 339,223. (No model.)

*To all whom it may concern:*

Be it known that I, THOMAS B. JEFFERY, a citizen of the United States, residing at Chicago, county of Cook, and State of Illinois, have invented certain new and useful Improvements in Velocipedes, which are fully set forth in the following specification, reference being had to the accompanying drawings, forming a part thereof.

Figure 1 is a side elevation of a front steering-wheel, a steering-head fork, and part of the backbone of a velocipede involving my invention. Fig. 2 is a front elevation of the forks within which said wheel is located. Fig. 3 is a section at the line 3 3 on Figs. 1 and 2, the wheel-hub being shown, however, in plan. Fig. 4 is a detail showing the joint in front fork. Fig. 5 is a sectional detail of the upper bearing of the spindle in the steering-head. Fig. 6 is a perspective of the bushing in such bearing. Fig. 7 is a section at the line 7 7 on Fig. 5.

A is the steering-wheel.

B is a fork, in the ends of which the steering-wheel is journaled, between whose arms it revolves.

C is the steering-head fork, to the stem C' of which is pivoted the spindle D', which forms the end of the backbone D. As illustrated, the steering-head comprises, it will be seen, the stem C' of the fork and the projecting lugs $C^{10}$ and $C^{11}$ thereon, which contain, respectively, the upper and lower bearings of the spindle D'. The upper bearing of the spindle D' is contained directly in the hollow bolt E, which is screwed to the lug $C^{10}$, and has the downwardly-open chamber E', into the upper end of which access is obtained through the oil-hole e', and which is otherwise closed at the top, making it constitute a cap-box or bearing. The chamber E' may be tapered slightly, being widest at the bottom, and into it is inserted the spring-bushing F. This bushing constitutes the peculiarity of this bearing, and the purpose of it and of its peculiarity may be best understood by considering the manner in which a bearing in this position is liable to wear in the use of the machine. And first, it should be noted that any tapered or conical bearing of a spindle which wears therein by rotary motion about the axis of the bearing necessarily experiences the greatest wear where it has the greatest diameter, and if such bearing is absolutely conical and the spindle therein a true cone there will be theoretically no wear whatever at the apex, because the radius at that point is zero, and the motion and therefore the friction reduced at that point to zero, and the wear at different points under the length of the cone will be proportionate to the radius at such points, so that the tendency of rotary movement of such a spindle in such a bearing will be to increase the angle of divergence of the sides, the taper of the spindle constantly becoming more and more abrupt. Any device for taking up lost motion in such a bearing in order to be fully effective must take into account this tendency of such a bearing to constantly widen at the base. In the particular bearing in question—that is to say, the bearing of the steering-spindle in the steering-head of a velocipede—the tendency is to wear chiefly at the front and rear and comparatively little at the sides, because the onward motion of the machine in travel tends to throw the pressure chiefly onto the front and rear. I have adapted the bushing F to take up the lost motion in this bearing in a manner corresponding to the wear, as above described. The bushing, which is of hardened steel, is a hollow cone fitted to the spindle and split from the base longitudinally to near the top, leaving only sufficient metal at the top to retain the two parts together. Preferably two rifts only are formed diametrically opposite, and the neck f', which joins the two halves $f^2$, separated by the rifts f, may be considered as a spring-hinge joining these two halves, any force tending to compress the bushing having the effect to move the base ends of the two halves $f^2$ toward each other as if they were hinged together upon a pivot at f'. More than two rifts f may be made—for example, four, in two planes at right angles to each other, dividing the bushing into four fingers or leaves diverging from the apex, and when this form is used the bushing will be adapted to take up lost motion upon all sides by any device which may tend to compress it on all sides at the base, and the adjustment effected by so compressing it will be greatest at the base, and will diminish toward the apex in the same ratio as the wear diminishes from base to apex upon the principle above explained. For the purpose of this particular bearing it is not essential that special provision be made for adjustment except from front and rear, because that adjustment of itself tends to take up to some extent the lateral wear, which is very slight, and which is sufficiently compensated in that way. In order to retain the bushing on the spindle in such position that the division effected by the rifts $f$ is transverse, so that the adjustment effected by compressing the bushing will be, as desired, in fore-and-aft line, so as to take effect upon the front and rear of the bearing, I provide the lug or lip $F^2$, projecting from the lower end of the bushing forwardly against the stem C' of the fork. The forward edge of said lip being suitably shaped to bear against the fork and prevent the bushing from turning in the bearing or on the spindle, the upper end of the bolt E is provided with a polygonal head to adapt it to be operated by a wrench, and the adjustment to compensate for wear is effected by screwing down the bolt through the lug $C^{10}$, and thereby compressing the bushing F at or near the base where the inner margin of the lower open end of the bolt bears upon the outside of the bushing. The taper of the chamber E' in the bolt E is preferably less than that of the bushing F, so that the bushing does not contact the inner surface of the chamber in the bolt throughout its whole length. It would not, however, prevent the operation of the device for the purpose of adjustment if the contact should be continuous throughout the length of the bolt; but by making the slight difference in taper indicated in Fig. 5 the necessity of absolute exactness in the position of the bolt E is avoided—that is, it is not necessary to exercise such extreme care to have the axis of the bolt coincide with the axis of the spindle, the slight variation being compensated by a slight tipping of the bushing in the chamber, said bushing constituting the actual bearing of the spindle, thus automatically adjusting itself to the position of the spindle.

Another feature of this invention consists in the jointed frame for the steering-wheel, comprised of two forks B and C, the former having the bearing of the wheels and the latter having at its upper part, as described, the bearing of the steering-spindle or pivotal connection of the steering-wheel frame to the main frame or backbone D. These two forks are pivoted together in a manner which is illustrated in Figs. 2 and 3, the fork B extending from the bearing of the wheel rearward and inclined downward and passing around the wheel, therefore, below the level of the axle, and the fork C, having its arms respectively pivoted to the two arms of the fork B at a short distance from the bearing or axle in said latter fork. This pivotal connection is preferably effected by forking each of the arms of the fork C at the end, making the small forks $C^2$ $C^2$ spread, respectively, in the same plane as the fork C itself is spread, said forks $C^2$ striding the arms of the fork B, respectively, and joined thereto by suitable pivot-bolts G, inserted through said fork $C^2$ and said arms of the fork B. The two forks B and C are retained in proper angular relation to each other by the springs H H, which are applied by being coiled around the pivots G, respectively, and having one arm H' extending up and stopped against the forward side of the arms of the fork C, and having the arms $H^2$ extending forward and stopped upon the upper side of the arms, respectively, of the fork B, so that the tendency of the reaction of said spring is to spread the forward angle between said forks—that is, to tip the fork C backward or, as the alternative effect, to elevate the fork B. These springs should be stiff enough so that with the weight of the rider upon the machine they will sustain the fork B in a position inclined slightly downward from the axle toward the rear. The brake J is pivoted to the fork B outside the rim of the wheel, and is thereby adapted to suitably bear upon the wheel whatever be the position of said fork or the consequent position of the steering-head or backbone. It will be obvious that the introduction of the joint in the wheel-frame by making it consist of the two forks B and C, so that the fork C is not pivoted at the center of the wheel, makes it impracticable to secure the back of the fork C, as would be the more common construction. In order to operate the brake, a cable K is attached to it and extends thence around a pulley K', which is journaled on the inner end of one of the pivot-bolts G. Said cable passes up thence along one of the arms of the fork C, and is attached to one end of the lever L, which is pivoted on the steering-head above the fork-arms C. To the other end of the lever L the brake-operating rod L' is connected and extends upward to the vicinity of the handle, where it may be operated in any familiar manner, the depression of the rod L' causing the brake to be applied to the wheel. To the fork B there is also secured the mud-guard M, said mud-guard being cut away in the plane of the wheel for a short distance to allow the brake access through it to the wheel-rim.

The advantage of locating the pivotal connection of the forks B and C rearward of the wheel-axle and below the horizontal plane of said axle is to cause the jolt occasioned by the collision of the wheel with any obstruction to be communicated as little as possible to the handles and backbone and seat. This pivot becoming the center of the arc in which the axle of the wheel moves when the wheel is thus obstructed, its location, as described, makes the path of movement of the wheel-axle with respect to the remainder of the machine—that is to say, primarily, with respect to the fork C—rearward and upward, such being substantially the direction of motion which it would be the tendency of such an obstruction to cause, so that the wheel yields readily in that direction under such circumstances.

I claim—

1. In a velocipede, in combination with the front steering-wheel, a fork striding such wheel and having the bearings for the wheel-axle, the steering-wheel fork also striding the wheel and having its arms respectively pivoted to the arms of the axle-bearing fork, a spring reacting between said pivoted forks tending to uphold their joint, and the brake supported on the wheel-bearing fork, substantially as set forth.

2. In a velocipede, in combination with the front steering-wheel, a fork striding such wheel at the rear side and having the bearings for the wheel-axle, the steering-fork pivoted to the axle-bearing fork rearward of and below the horizontal plane of the axle, a spring reacting between said pivoted forks, tending to tip the steering-fork rearward, and the brake pivoted to the wheel-bearing fork, substantially as set forth.

3. In a velocipede, in combination with the front steering-wheel, a fork which strides the wheel and has the bearings for the wheel-axle, the mud-guard secured to such fork, and the steering-fork, which also strides the wheel and has its arms respectively pivoted to the arms of the axle-bearing fork, and a spring reacting between said pivoted forks tending to uphold their joint, substantially as set forth.

4. In a velocipede, in combination with the front steering-wheel, a fork which strides the wheel at the rear side and has the bearings for such wheel, the mud-guard secured to such fork, and the brake pivoted to the fork, the steering-fork pivoted to the axle-bearing fork, and a spring reacting between said pivoted forks tending to tip the steering-fork rearward, substantially as set forth.

5. In a velocipede, in combination with the steering-wheel, a fork striding said wheel at the rear side and having at its forward part the axle-bearings of the wheel, the steering-fork pivoted to the axle-bearing fork rearward of the axle-bearings and below the horizontal plane of the same, a spring reacting between said pivoted forks tending to tip the steering-fork rearward, the brake pivoted to the axle-bearing fork at the rear, a cable connected to the brake passing around the guide-pulley at the pivot of said forks, and a lever on the steering-head to which said brake-cable is attached, substantially as set forth.

6. In a velocipede, a spindle-bearing comprising, in combination, a hollow bolt E, a fixed support in which it is secured and longitudinally adjustable, and a tapering bushing adapted to be inserted into the bolt-chamber and contact its inner surface, and provided with a stop to prevent its rotation with the spindle, whereby such bushing affords the bearing-surface for the spindle and is reducible in diameter by forcing the bolt longitudinally onto it, substantially as set forth.

7. In a velocipede, a spindle-bearing comprising the hollow bolt E, a fixed support in which such bolt is secured and longitudinally adjustable, and the tapering bushing F, adapted to be inserted into the open end of such hollow bolt, said bushing being longitudinally split from the base toward the apex, whereby it is adapted to be compressed at the base by forcing the bolt longitudinally onto it, substantially as set forth.

8. In a velocipede, a spindle-bearing comprising a hollow bolt E, a fixed support into which it is screwed, and the tapering bushing F, longitudinally split from the base to a point near the tip or apex, said bushing being adapted to be inserted within the hollow bolt and having a portion projecting therefrom, whereby it is stopped against the fixed support of said bolt to prevent rotary motion of such bushing, substantially as and for the purpose set forth.

9. In a velocipede, a steering-head spindle-bearing comprising, in combination, a hollow bolt E, a fixed support in which it is secured and longitudinally adjustable, and a tapering bushing adapted to be inserted into the bolt-chamber and contact its inner surface, and provided with a stop outside the bolt to prevent the bushing turning either with the spindle or with the bolt, such bushing being split longitudinally from the base toward the apex in a plane transverse to the plane of the wheels, substantially as set forth.

10. In a velocipede, a spindle-bearing comprising a hollow bolt E, a fixed support in which such bolt is secured and longitudinally adjustable, and the tapering bushing F, adapted to be inserted into the chamber of such hollow bolt and provided with a part projecting therefrom and stopped against the fixed support of said bolt to prevent the bushing from turning about its axis, the chamber of said bolt being of such size at its end that it binds upon the outer surface of the bushing, but having its walls diverging from the walls of the bushing inwardly, whereby said bushing is adapted to adjust itself automatically within the hollow bolt to vary the position of its axis slightly from that of the axis of the bolt, substantially as set forth.

In testimony whereof I have hereunto set my hand, at Chicago, Illinois, this 29th day of January, A. D. 1890.

THOS. B. JEFFERY.

Witnesses:
CHAS. S. BURTON,
JEAN ELLIOTT.